United States Patent
Kiyomura et al.

(10) Patent No.: US 6,753,371 B2
(45) Date of Patent: Jun. 22, 2004

(54) FLUORINE RUBBER COMPOSITION, FIXING MEMBER, FIXING DEVICE, FIXING METHOD, AND METHOD OF MANUFACTURING FIXING DEVICE

(75) Inventors: Yoshihiro Kiyomura, Oonojo (JP); Hirofumi Kama, Oomuta (JP); Hiroyuki Noda, Ogoori (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 64 days.

(21) Appl. No.: 09/863,799

(22) Filed: May 24, 2001

(65) Prior Publication Data

US 2002/0016400 A1 Feb. 7, 2002

(30) Foreign Application Priority Data

Jun. 1, 2000 (JP) ........................................ 2000-164293

(51) Int. Cl.[7] ................................................. C08K 3/18
(52) U.S. Cl. ........................ 524/430; 524/421; 524/545; 524/546; 428/421; 430/105; 427/226
(58) Field of Search ................................. 524/430, 545, 524/546, 421; 430/105; 427/226; 428/421

(56) References Cited

U.S. PATENT DOCUMENTS

| | | |
|---|---|---|
| 4,640,600 A | 2/1987 | Hirabayashi et al. |
| 4,830,920 A | 5/1989 | Hayashi et al. |
| 5,177,550 A | 1/1993 | Uehara et al. |
| 5,324,755 A * | 6/1994 | Kilius et al. ................ 523/214 |
| 5,374,453 A * | 12/1994 | Swei et al. .................. 427/226 |
| 5,480,231 A * | 1/1996 | Sasaki et al. ................ 384/206 |
| 5,639,549 A * | 6/1997 | Fukunaga et al. .......... 428/379 |
| 5,825,591 A * | 10/1998 | Nakamura et al. ....... 360/234.1 |
| 5,995,796 A * | 11/1999 | Schlueter, Jr. et al. ...... 399/313 |
| 6,011,946 A * | 1/2000 | Eddy et al. .................. 399/333 |
| 6,180,176 B1 * | 1/2001 | Gledhill et al. ............. 427/387 |
| 2001/0022909 A1 * | 9/2001 | Takeuchi et al. ............ 399/328 |

FOREIGN PATENT DOCUMENTS

| | | | |
|---|---|---|---|
| EP | 0441646 | * | 8/1991 |
| JP | 04-319980 | | 11/1992 |
| JP | 04319980 | * | 11/1992 |

* cited by examiner

Primary Examiner—David W. Wu
Assistant Examiner—Henry S. Hu
(74) Attorney, Agent, or Firm—McDermott, Will & Emery

(57) ABSTRACT

A fluorine rubber composition used for the surface layer material of a fixing member to fix a toner transferred onto a recording material comprises fluorine rubber having a polymerization degree based on vinylidene fluoride. The fixing member includes a base material, and a surface layer material disposed on the surface of the base material, and the surface layer material contains fluorine rubber having a polymerization degree base on vinylidene fluoride. Preferably, the fluorine rubber composition contains a reinforcing agent, antacid, vulcanizing agent, vulcanization accelerator, spherical filler, and solvent. Preferably, the fixing member has numerous fine convex portions on its surface. Accordingly, the amount of the toner adhering to the surface of the fixing member is reduced. Thus, generation of offset trouble can be reliably prevented for a long period of time. As a result, the durability of the fixing member will be improved.

23 Claims, 3 Drawing Sheets

FLUORINE RUBBER COMPOSITION, FIXING MEMBER, FIXING DEVICE, FIXING METHOD, AND METHOD OF MANUFACTURING FIXING DEVICE

FIELD OF THE INVENTION

The present invention relates to a fluorine rubber composition used in an image picture forming apparatus, a fixing member, a fixing device, a fixing method, and a method of manufacturing the fixing device.

BACKGROUND OF THE INVENTION

In an image picture forming apparatus, a toner transferred onto a recording material such as paper or the like is fixed by a fixing device installed in the apparatus.

FIG. 6 is a sectional view of a conventional fixing device. The fixing device which serves to fix a toner 13 transferred onto a recording material 12 comprises a fixing roller 201 being a fixing member, a press roller 102 opposing to the fixing roller 201, and a web 104 impregnated with silicone oil as a lubricant to prevent sticking of toner T to surface layer 203 of the fixing roller 201. The fixing roller 201 and the press roller 102 are formed by coating a core bar 105 with an elastic body 106. A heater 107 as a heat source is disposed in the core bar 105 of the fixing roller 201.

Recording material 12 such as paper or the like with a picture image formed thereon by transferring the toner 13 is caught between the fixing roller 201 and the press roller 102, and is heated and pressed, then the toner 13 is fixed on the recording material 12.

However, the toner 13 increases in viscosity due to the heat. Accordingly, as shown in the partly enlarged view of FIG. 3 showing a state of picture image fixation in a conventional fixing device, a part of the toner 13 on the recording material 12 adheres to the surface of the fixing roller 201. As a result, when the next recording material 12 advances toward the fixing roller 201 heated, the toner 13, increasing in viscosity and adhering to the fixing roller 201, is partially transferred onto the next recording material 12. This process is generally called offset, and frequent generation of offset means the termination of the life of the fixing device.

In order to prevent generation of such offset, in the prior art, the toner is fixed by heat and pressure of the fixing roller 201 and the press roller 102 while applying a lubricant such as silicone oil to the fixing roller 201. There are some different methods of lubricant application to the fixing roller 201. For examples, as shown in FIG. 6, a lubricant is applied to the fixing roller 201 by contacting the web 104 with the fixing roller 201. The web 104 is pressed against the fixing roller 201 by a web pressing roller 108 and is taken up onto a web take-up roller 110 from a web feed roller 109 at a predetermined speed.

However, in a conventional fixing device, the surface layer 203 of the fixing roller 201 is formed of silicone rubber, fluorine rubber or the like. Since the fixing roller 201 is heated, the surface layer 203 of the fixing roller 201 is deteriorated due to the heat. Further, in use of the fixing roller 201 for a long period of time, the surface layer 203 becomes worn and scratched due to sticking of paper and dust. In case the surface layer 203 is worn or scratched, the toner 13 will stick to the surface layer 203 of the fixing roller 201 despite that the surface layer 203 is coated with a lubricant. That is, there are not a few chances of generation of offset even when the surface layer 203 is coated with a lubricant.

A fixing device capable of preventing such offset is disclosed in Japanese Laid-Open Patent No. 4-319980. The fixing device disclosed in Japanese Laid-Open Patent No. 4-319980 comprises a fixing roller and a roller polishing means to polish the fixing roller surface. The fixing roller used is a single-layer roller formed of methyl or methylvinyl type silicone rubber, and the silicone oil used is methylphenyl type silicone oil.

In such fixing roller, the fixing roller surface is always refreshed since the fixing roller surface is polished by the roller polishing means. As a result, generation of offset can be prevented. Also, since a single-layer roller formed of silicone rubber is employed, polishing the fixing roller surface does not cause the under layer material to be exposed, thereby improving the durability.

However, in such prior art fixing device, the optimum conditions for roller polishing vary with various factors such as grain sizes of polishing material, grain shapes, its contents in silicone oil, abutment pressures to the fixing roller of cleaning web as a roller polishing means, abutment areas, fiber density of web, and material quality of roller rubbers. Accordingly, it is difficult to find and maintain optimum values in relation to a number of these factors. Further, as the fixing roller surface is polished, the roller will be reduced in diameter through use for a long period of time. Consequently, the above-mentioned factors at their optimum values are influenced, gradually going wrong.

The present invention is intended to improve the durability of the fixing member, preventing generation of offset reliably for a long period of time by lessening the amount of toner sticking to the fixing member surface without polishing the fixing member surface of a roller or the like.

SUMMARY OF THE INVENTION

A fluorine rubber composition of the present invention, used for the surface layer material of a fixing member to fix a toner transferred onto a recording material, comprises:

(a) fluorine rubber having a polymerization degree based on vinylidene fluoride; and (b) at least one selected from the group consisting of a reinforcing agent, an antacid, a vulcanizing agent, a vulcanization accelerator, a spherical filler, and an organic solvent.

A fixing member of the present invention for fixing a toner transferred onto a recording material comprises:

a base material and a surface layer material disposed on the base material, wherein the surface layer material contains fluorine rubber having a polymerization degree based on vinylidene fluoride.

A fixing device of the present invention for fixing a toner transferred onto the surface of a recording material comprises:

a fixing roller;

a press roller disposed opposing the fixing roller; and a web to apply a lubricant to the surface of the fixing roller, wherein the fixing roller comprises a base material and a surface layer material disposed on the surface of the base material;

the surface layer material contains fluorine rubber having a polymerization degree based on vinylidene fluoride; and a recording material having the toner transferred thereon passes between the fixing roller and the press roller while being pressed by the fixing roller and the press roller so that the surface layer material comes in contact with the toner, and thereby, the toner is fixed on the recording material.

A fixing method of the present invention comprises:

(a) a step of transferring a toner onto the surface of a recording material:

(b) a step of passing the recording material, having the toner transferred thereon, between a fixing roller and a press roller, under pressures applied by the fixing roller and the press roller, wherein the fixing roller comprises a base material and a surface layer material disposed on the surface of the base material;

the recording material passes between the rollers in a manner such that the toner is positioned at the fixing roller side;

the surface layer material contains fluorine rubber having a polymerization degree based on vinylidene fluoride; and (c) a step of fixing the toner, pressed by the fixing roller and the press roller, on the surface of the recording material.

A method of manufacturing a fixing device of the present invention for fixing a toner transferred onto the surface of a recording material comprises the steps of:

(a) manufacturing a fixing roller; and (b) manufacturing a press roller, wherein the step of manufacturing the fixing roller comprises the steps of:

(1) manufacturing a paint;

wherein the step of manufacturing the paint includes a step of mixing and dispersing fluorine rubber having a polymerization degree based on vinylidene fluoride, a vulcanizing agent, and a solvent;

(2) applying the paint onto the surface of a base material having a spherical shape; and (3) drying and hardening the paint applied to the surface of the base material to form a surface layer material.

Preferably, the fluorine rubber contains at least one copolymer selected from the group consisting of a copolymer of tetrafluoroethylene, vinylidene fluoride and hexafluoropropylene; a copolymer of tetrafluoroethylene, vinylidene fluoride and propylene; and a copolymer of vinylidene fluoride and hexafluoropropylene.

By the above configuration, the amount of toner sticking to the surface of a fixing member is reduced. Accordingly, generation of offset can be reliably prevented for a long period of time. Further, the durability of the fixing member will be improved.

DESCRIPTION OF THE REFERENCE NUMERALS

Figure 1:
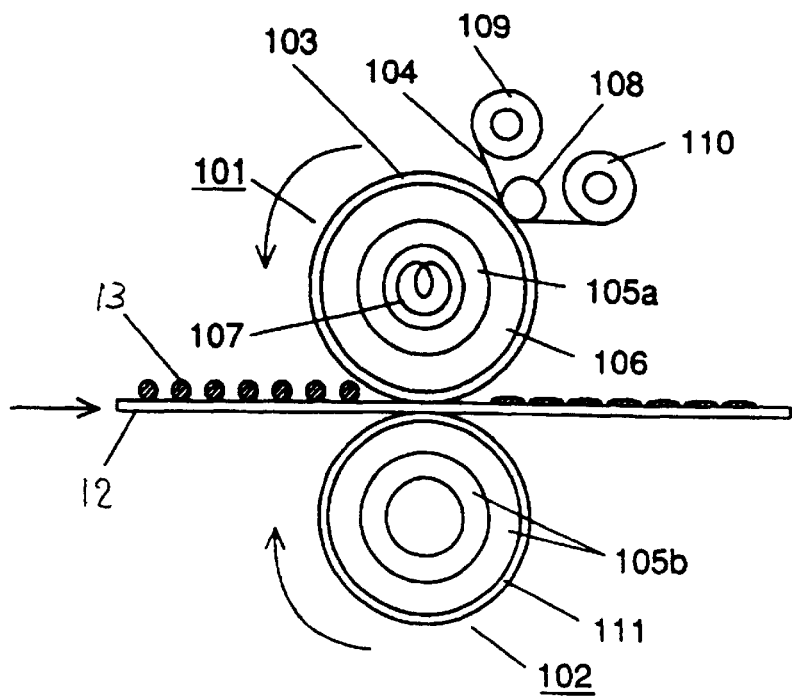
FIG. 1 is a sectional view of a fixing device of an embodiment of the present invention.

101 Fixing roller (fixing member)
102 Press roller
103, 103a, 103b, 103c, 103d Surface layer material
104 Web
105a, 105b Core bar (base material)
106 Rubber elastic body (base material)
107 Heater
108 Web pressing roller
109 Web feed roller
110 Web take-up roller
111 Press roller surface layer
12 Recording material
13 Toner

DETAILED DESCRIPTION OF THE INVENTION

The present invention relates to a fixing member with a film formed by applying a predetermined fluorine rubber composition to the fixing member surface at the fixing member for fixing a toner transferred onto a recording material. Since the predetermined fluorine rubber composition is disposed on the fixing member surface, numerous fine convex portions are formed on the fixing member surface.

The tips of the small convex portions formed on the fixing member surface layer are preferable to be smooth in shape. In the present embodiment, a spherical filler is filled into the surface layer material, and smooth convex portions are formed on the fixing member surface layer.

Since fine and smooth convex portions are formed on the fixing member surface layer, in fixing a toner transferred onto a recording material, the toner comes into contact with the convex portions on the fixing member surface layer via a lubricant. The toner on the recording material, after passing the fixing member, adheres to the recording material which is larger in contact area than the fixing member surface layer. Accordingly, the amount of the toner adhering to the fixing member surface is reduced, and generation of offset can be reliably prevented for a long period of time. As a result, the durability of the fixing member will be improved.

As solid content dispersed in the fluorine rubber composition, a reinforcing agent to strengthen the fluorine rubber composition and an antacid or the like to prevent generation of hydrogen fluoride in forming a film of the fluorine rubber composition are employed.

As a reinforcing agent, carbon block is generally employed. In the present embodiment, medium thermal carbon is used as a reinforcing agent. Medium thermal carbon is produced by contacting natural gas with a solid heated at high temperatures. Since the average grain size of medium thermal carbon in a state of being dispersed in a fluorine rubber composition is less than 5 $\mu$m, the surface of the fluorine rubber composition is increased in smoothness when the fluorine rubber composition is formed into a film.

As an antacid, divalent metal oxide and hydroxide such as magnesium oxide, zinc oxide, lead oxide, and calcium hydroxide are generally employed. Since the average grain size of an antacid in a state of being dispersed in a fluorine rubber composition is less than 5 $\mu$m, the surface of the fluorine rubber composition is increased in smoothness when the fluorine rubber composition is formed into a film.

As a proper method of measuring average grain size for filler grains, there is a laser diffracting grain distribution measuring method. The grain size of filler grains can be obtained by the theory of Fraunhofer diffraction with respect to diffracted patterns obtained by application of a laser beam to the grains. To obtain the average grain size, filler grains were diluted in a solvent, and the samples of fluorine rubber composition with the density of filler grains adjusted were passed through a measuring cell to obtain the size of grain passing through, and then the grain size most frequently corresponding to the obtained grain size was adopted as the average grain size.

The fluorine content of a fluorine rubber composition can be obtained by analyzing the components generated when the fluorine rubber composition is burnt at high temperatures.

A fluorine rubber composition of one embodiment of the present invention, used for the surface layer material of a fixing member to fix a toner transferred onto a recording material, comprises:

(a) fluorine rubber having a polymerization degree based on vinylidene fluoride; and (b) at least one selected from the group consisting of a reinforcing agent, an antacid, a vulcanizing agent, a vulcanization accelerator, a spherical filler, and an organic solvent.

When a toner is fixed by using such fluorine rubber composition as the surface layer material of a fixing member, the adhesion of the toner to the surface of the fixing member is lowered, and accordingly, the amount of the toner sticking to the surface layer material of the fixing member is reduced. As a result, generation of offset can be prevented.

A fixing device of the present invention for fixing a toner transferred onto the surface of a recording material comprises:

a fixing roller;

a press roller disposed opposing the fixing roller; and a web to apply a lubricant to the surface of the fixing roller, wherein the fixing roller comprises a base material and a surface layer material disposed on the surface of the base material;

the surface layer material contains fluorine rubber having a polymerization degree based on vinylidene fluoride; and a recording material having the toner transferred thereon passes between the fixing roller and the press roller while being pressed by the fixing roller and the press roller so that the surface layer material comes into contact with the toner, and thereby, the toner is fixed on the recording material.

By this configuration, when a toner is fixed, the adhesion of the toner to the surface of the fixing member is lowered, and accordingly, the amount of the toner sticking to the surface layer material of the fixing member is reduced. As a result, generation of offset can be prevented. Further, a fixing device having excellent durability can be obtained.

A fixing method of one embodiment of the present invention comprises:

(a) a step of transferring a toner onto the surface of a recording material;

(b) a step of passing the recording material, having the toner transferred thereon, between a rotating fixing roller and press roller, under pressures applied by the fixing roller and the press roller, wherein the fixing roller comprises a base material and a surface layer material disposed on the surface of the base material;

the recording material passes between the rollers in a manner such that the toner is positioned at the fixing roller side;

the surface layer contains fluorine rubber having a polymerization degree based on vinylidene fluoride; and (c) a step of fixing the toner, pressed by the fixing roller and the press roller, on the surface of the recording material.

By this configuration, when a toner is fixed, the adhesion of the toner to the surface of the fixing member is lowered, and accordingly, the amount of the toner sticking to the surface layer material of the fixing member is reduced. As a result, generation of offset trouble can be prevented. Further, a fixing device having excellent durability can be obtained.

A method of manufacturing a fixing device of one embodiment of the present invention for fixing a toner transferred onto the surface of a recording material comprises the steps of:

(a) manufacturing a fixing roller; and (b) manufacturing a press roller, wherein the step of manufacturing the fixing roller comprises the steps of:

(1) manufacturing a paint;

wherein the step of manufacturing the paint includes a step of mixing and dispersing fluorine rubber having a polymerization degree based on vinylidene fluoride, a vulcanizing agent, and a solvent;

(2) applying the paint onto the surface of a base material having a spherical shape; and (3) drying and hardening the paint applied to the surface of the base material to form a surface layer material.

By this configuration, when a toner is fixed, the adhesion of the toner to the surface of the fixing member is lowered, and accordingly, the amount of the toner sticking to the surface layer material of the fixing member is reduced. As a result, generation of offset can be prevented. Further, a fixing device having excellent durability can be obtained.

Preferably, the fluorine rubber contains at least one copolymer selected from the group consisting of a copolymer of tetrafluoroethylene, vinylidene fluoride and hexafluoropropylene; a copolymer of tetrafluoroethylene, vinylidene fluoride and propylene; and a copolymer of vinylidene fluoride and hexafluoropropylene.

By this configuration, the advantage described above will be further enhanced.

Preferably, the copolymer contains fluorine in a range from 60 wt % to 70 wt %. This configuration will further enhance the advantage described above.

When the fluorine contained in the copolymer is less than 60 wt %, the advantage mentioned above will be slightly reduced. Also, when the fluorine content exceeds 70 wt %, a lubricant is hard to adhere to the surface of the fixing member. And consequently, the effect to prevent the toner from sticking to the surface of the fixing member will be slightly reduced.

Preferably, the fluorine rubber composition contains the reinforcing agent, and the reinforcing agent contains medium thermal carbon.

Preferably, the reinforcing agent is less than 5 $\mu$m in average grain size in a state of being dispersed in the surface layer material.

Thus, when the fluorine rubber composition is used for the surface layer material of a fixing member, the surface of the fixing member is increased in smoothness. Accordingly, the adhesion of the toner to the surface of the fixing member is lowered, and the amount of the toner sticking to the surface layer material of the fixing member is reduced. As a result, generation of offset can be prevented. That is, the surface layer material of the fixing member is increased in strength, and also, by reducing the average grain size of the reinforcing agent to be filled and further adding a spherical filler, it is possible to form fine convex portions on the fixing member surface. Further, in fixing a toner transferred onto a recording material, the toner is selectively fixed on the recording material having rougher surfaces, and thereby, generation of offset can be reliably prevented for a long period of time. As a result, the durability of the fixing roller will be improved.

Medium thermal carbon is smaller in specific surface area as compared with other carbon black such as channel black and furnace black. Therefore, it is less in the quantity of fluorine rubber composition required for wetting the surfaces of carbon black grains. Accordingly, it becomes possible to fill an increased amount of reinforcing agent when the reinforcing agent is dispersed in the fluorine rubber composition. Consequently, the surface layer material of the fixing member can be improved in strength by using medium thermal carbon.

The specific surface area of carbon black grain can be obtained by an adsorption process. A gas such as carbon dioxide or the like of which the molecular sectional area is known is adsorbed onto the surface of carbon black to cover the surface of the carbon black with monomolecular film of the gas. The specific surface area of the carbon black can be measured from the volume of the adsorbed gas.

When the average grain size of medium carbon black in a fluorine rubber composition exceeds 5 $\mu$m, and the fluorine rubber composition is used for the surface layer of a fixing member, then the surface of the fixing member will increase in roughness. As a result, the advantage described above will be slightly lessened.

Preferably, a fluorine rubber composition contains the reinforcing agent, and the reinforcing agent is contained in a range from 20 parts to 40 parts by weight as against 100 parts by weight of the fluorine rubber.

By this configuration, a film having an appropriate strength can be obtained when the fluorine rubber composition is used for the surface layer of a fixing member. Accordingly, even in case of fixing for a long period of time, the surface of the fixing member will be less in wear and abrasion. Also, generation of offset can be prevented. That is, the surface layer material of the fixing member is given an appropriate strength. Also, fine convex portions can be formed on the surface of the fixing member by adding a spherical filler. When fixing a toner transferred onto a recording material, the toner is selectively fixed on the recording material having rougher surfaces, and thereby, generation of offset can be reliably prevented for a long period of time. As a result, the durability of the fixing roller will be improved.

When the quantity of medium thermal carbon is less than 20 parts by weight as against 100 parts by weight of fluorine rubber composition, and the fluorine rubber composition is used for the surface layer of a fixing member, then the film coat will increase a little in softness. Therefore, in case of fixing for a long period of time, the fixing member surface wears down a little, and thereby, the above advantage will be slightly lessened.

Also, when the quantity of medium thermal carbon exceeds 40 parts by weight as against 100 parts by weight of fluorine rubber composition, the film coat of the surface layer material of the fixing member becomes slightly brittle, and in case of fixing for a long period of time, the fixing member surface wears down a little, and the advantage described above will be slightly lessened.

Preferably, the fluorine rubber composition contains the antacid, and the antacid contains at least one of divalent metal oxide and hydroxide.

By this configuration, in hardening the fluorine rubber composition, generation of hydrogen fluoride is prevented, and thereby, hardening of the fluorine rubber composition will be promoted. In this way, the fluorine rubber composition may be sufficiently hardened. As a result, it is possible to obtain a surface layer of a fixing member which ensures excellent durability. That is, when drying the surface layer material of the fixing member, hardening of the surface layer material will be promoted. The surface layer material of the fixing member is increased in strength. Also, by reducing the average grain size of the reinforcing agent to be filled and further adding a spherical filler, fine convex portions can be formed on the fixing member surface. Therefore, when fixing a toner transferred onto a recording material, the toner is selectively fixed on the recording material having rougher surfaces, and generation of offset can be reliably prevented for a long period of time, thereby improving the durability of the fixing roller.

Preferably, the antacid is less than 5 $\mu$m in average grain size in a state of being dispersed in the surface layer material.

By this configuration, when the fluorine rubber composition is used for the surface layer of a fixing member, the fixing member surface is increased in smoothness. As a result, in fixing a toner, it is possible to lower the adhesion of the toner to the fixing member surface, and thereby, generation of offset can be prevented.

Preferably, the antacid is contained in a range from 5 parts to 20 parts by weight as against 100 parts by weight of the fluorine rubber.

When the quantity of antacid is less than 5 parts by weight as against 100 parts by weight of fluorine rubber composition, and the fluorine rubber composition is used for the surface layer material of a fixing member, then the fluorine rubber composition is not sufficiently hardened, causing the film coat of the surface layer material is increased in softness. Accordingly, in case of fixing for a long period of time, the fixing member surface wears down a little. As a result, the above advantage will be slightly lessened.

Also, when the quantity of antacid exceeds 20 parts by weight as against 100 parts by weight of fluorine rubber composition, and the fluorine rubber composition is used for the surface layer material of a fixing member, then the film coat of the surface layer becomes brittle, and in case of fixing for a long period of time, the fixing member surface wears down a little. As a result, the advantage described above will be slightly lessened.

Preferably, the fluorine rubber composition contains a vulcanizing agent, and the vulcanizing agent contains at least one of polyol type compound and amine type compound.

By this configuration, the fluorine rubber composition can be sufficiently hardened. As a result, it is possible to obtain a surface layer material of a fixing member having excellent durability.

As a polyol type vulcanizing agent, all of commonly known compounds used for polyol vulcanization of copolymer can be used. Particularly, aromatic hydroxy compounds such as bisphenol AF, bisphenol A, or hydroquinone are preferably to be used as a polyol type vulcanizing agent.

As an amine type vulcanizing agent, all of commonly known compounds used for amine vulcanization of vinylidene fluoride type copolymer can be used. Particularly, hexamethylene diamine, hexamethylene diamine dicarbamate, dicinnamyldenum hexamethylene diamine, etc. are preferable to be used as an amine vulcanizing agent.

Preferably, the fluorine rubber composition contains a vulcanizing agent, and the vulcanizing agent is contained in a range from 0.5 part to 5 parts by weight as against 100 parts by weight of the fluorine rubber.

By this configuration, the fluorine rubber composition can be sufficiently hardened. As a result, it is possible to obtain a surface layer material of a fixing member having excellent durability.

When the quantity of vulcanizing agent is less than 0.5 part by weight as against 100 parts by weight of fluorine rubber composition, the fluorine rubber composition is not sufficiently hardened. Accordingly, the above advantage will be slightly lessened.

Also, when the quantity of vulcanizing agent exceeds 5 parts by weight as against 100 parts by weight of fluorine rubber composition, and the fluorine rubber composition is used for the fixing member surface layer, then the film coat becomes brittle. Accordingly, in case of fixing for a long period of time, the fixing member surface wears down a little. As a result, the advantage described above will be slightly lessened.

Preferably, the fluorine rubber composition contains the vulcanization accelerator, and the accelerator contains at least one of organic quaternary phosphonium salt and organic quaternary ammonium salt.

By this configuration, hardening of the fluorine rubber composition can be promoted. Accordingly, it is possible to obtain a surface layer material of a fixing member having excellent durability.

As an unsaturated multifunctional compound, it is preferable to use triallylisocyanulate, triallylcyanulate, trimethylol propane trimethacrylate, polybutadiene, etc.

As an organic salt used as a vulcanization accelerator, it is preferable to use tetrabutyl ammonium acid sulfate, tetrabutyl ammonium bromide, 8-benzyl-1,8-diazabicyclo [5.4.0.] undeca-7-enium chloride, p-toluenesulfonic acid, 1,8-diazabicyclo [5.4.0.] undeca-7-eniuin, tetrabutyl phosphonium chloride, trioctylmethyl phosphonium chloride, triphenyl benzyl phosphonium chloride, 1,8-diazabicyclo [5.4.0.] undeca-7-salt, pyridine, tributylamine, triphenylphosphine, tributyiphosphite, etc.

Preferably, the vulcanization accelerator is contained in a range from 0.5 part to 5 parts by weight as against 100 parts by weight of the fluorine rubber composition.

By this configuration, the fluorine rubber composition can be sufficiently hardened. As a result, it is possible to obtain a surface layer material of a fixing member having excellent durability.

When the quantity of vulcanization accelerator is less than 0.5 part by weight as against 100 parts by weight of fluorine rubber composition, the fluorine rubber composition is not sufficiently hardened. Accordingly, the above advantage will be slightly lessened.

Also, when the quantity of vulcanization accelerator exceeds 5 parts by weight as against 100 parts by weight of fluorine rubber composition, and the fluorine rubber composition is used for the fixing member surface layer, then the film coat becomes brittle. Accordingly, in case of fixing for a long period of time, the fixing member surface wears down a little. As a result, the advantage described above will be slightly lessened.

Preferably, the fluorine rubber composition contains a spherical filler, and the spherical filler is over 80% in sphericity.

Still preferably, the spherical filler ranges from 0.5 $\mu$m to 10 $\mu$m in average grain size.

By this configuration, when the fluorine rubber composition is applied onto the surface of a fixing member and dried, spherical convex portions can be formed on the surface of the fixing member. Therefore, when a toner is fixed, the contact area of the toner adhering to the fixing member surface is decreased. Accordingly, the adhesion of the toner sticking to the fixing member is lowered, and also the amount of the toner sticking to the fixing member is reduced. As a result, generation of offset can be prevented.

When the major axis and minor axis of the relevant grain are "A" and "B" respectively, the sphericity (%) of the spherical filler can be represented by $\{1-(|A-B|)/2\} \times 100$ (%). The grain size is measured through a process of taking photos of the relevant grain by an optical or electronic microscope and a process of measuring the size of the photographed grain.

In case the sphericity of the spherical filler is less than 80%, spherical convex portions will not be formed on the surface of the fixing member. Accordingly, in toner fixing, the effect to reduce the contact area of the toner coming into contact with the fixing member surface is decreased. As a result, the above advantage will be slightly lessened.

In case the average grain size of the spherical filler is less than 0.5 $\mu$m, it is not possible to form spherical convex portions on the surface of the fixing member. Therefore, in toner fixing, the contact area of the toner coming into contact with the fixing member surface cannot be reduced. As a result, the above advantage will be slightly lessened.

When the average grain size of the spherical filler exceeds 10 $\mu$m, and it is used for the surface of a fixing member, then the spherical convex portions obtained will become larger. Therefore, in toner fixing, the toner coming into contact with the fixing member surface will get into gaps between convex portions. Accordingly, the toner is hard to adhere to the fixing member surface. As a result, the above advantage will be slightly lessened.

Preferably, the spherical filler is contained in a range from 5 parts to 30 parts by weight as against 100 parts by weight of the fluorine rubber.

By this configuration, when the fluorine rubber composition is applied onto the surface of a fixing member and dried, spherical convex portions can be formed on the surface of the fixing member. Therefore, in toner fixing, the contact area of the toner coming into contact with the fixing member surface is reduced. Accordingly, the adhesion of the toner sticking to the fixing member is lowered, and the amount of the toner sticking to the fixing member is decreased. As a result, generation of offset can be prevented.

When the quantity of spherical filler is less than 5 parts by weight as against 100 parts by weight of fluorine rubber composition, the number of spherical convex portions formed on the surface of the fixing member is reduced. As a result, the above advantage will be slightly lessened.

Also, when the quantity of spherical filler exceeds 30 parts by weight as against 100 parts by weight of fluorine rubber composition, the film coat of the surface layer material of the fixing member becomes brittle, and in case of fixing for a long period of time, the fixing member surface wears down a little. As a result, the above advantage will be slightly lessened.

Preferably, the fluorine rubber composition includes an organic solvent, and the fluorine rubber composition is dissolved in the organic solvent. Or, the reinforcing agent and the spherical filler are uniformly dispersed.

The organic solvent is used to change fluorine rubber composition into a paint. There is no special limitations on the type and quantity of the organic solvent used, and they can be properly selected according to the painting method. The organic solvent has a function to dissolve or disperse at least one selected from the group consisting of a reinforcing agent, antacid, vulcanizing agent, vulcanization accelerator, and spherical filler.

A fixing device of one embodiment of the present invention for fixing a toner transferred onto the surface of a recording material comprises a base material and a surface layer material disposed on the surface of the base material, and the surface layer material contains fluorine rubber having a polymerization degree based on vinylidene fluoride.

Since such fluorine rubber composition is used as the surface layer material of a fixing member, when a toner is fixed, the adhesion of the toner to the surface of the fixing member is lowered. Accordingly, the amount of the toner sticking to the surface layer material of the fixing member is reduced, and as a result, generation of offset can be prevented.

Preferably, the surface layer material has numerous fine convex portions.

By this configuration, when a toner is fixed, the contact area of the toner coming in contact with the surface of the fixing member is decreased. Therefore, the adhesion of the toner sticking to the fixing member is lowered, and also, the amount of the toner sticking to the fixing member is reduced. As a result, the above advantage will be further enhanced.

Preferably, each convex portion of the numerous fine convex portions has a spherical tip.

By this configuration, when a toner is fixed, the contact area of the toner coming into contact with the fixing member surface is decreased. As a result, the above advantage will be further enhanced.

Preferably, the surface layer material is less than 5 $\mu$m in surface roughness (Rz).

By this configuration, when a toner is fixed, the contact area of the toner coming in contact with the fixing member surface is decreased. Accordingly, the adhesion of the toner adhering to the fixing member is lowered. As a result, the above advantage will be further enhanced.

Surface roughness "Rz" is to be a standard for evaluating the surface roughness mentioned in 34. Metal surface treatment of JIS Handbook. The profile curve is measured by a surface roughness meter of contact type, etc. From the profile curve, the maximum height average value of elevation is measured with respect to the peaks from the highest to the fifth highest measured in the direction of longitudinal magnification from the straight line, being parallel to the average line and not traversing the profile curve, at a portion with only the standard length removed. Further, the maximum depth average value of elevation is measured with respect to the bottoms from the deepest to the fifth deepest. The difference between the maximum height average value and the maximum depth average value is measured on a micro-meter unit.

When the surface roughness "Rz" of a fixing member exceeds 5 $\mu$m, the surface of the fixing member is increased in roughness. Therefore, when a toner is fixed, the toner is hard to adhere to the fixing member surface due to anchor effect. As a result, the above advantage will be slightly lessened.

Preferably, the fine convex portions are formed in a range from 5,000 pieces to one million pieces per square millimeter.

By this configuration, the adhesion of the toner sticking to the fixing member is further decreased. As a result, the above advantage will be further enhanced.

An electronic microscope is used for counting the number of convex portions on the surface of a fixing member. A piece of surface layer material of about a few square millimeters is cut out of a fixing member surface, and the material is photographed and observed by using-an electronic microscope. A microscope of about 1,000 to 10,000 magnifications is employed. The number of convex portions existing in an area from 10 $\mu$m sq. to 1 $\mu$m sq. of the fixing member surface is counted.

The toner fixed is softened due to heat and squeezed by pressures. Therefore, the squeezed toner comes into contact with the recording material or fixing member surface in larger area as compared to the original grain size. In that case, when the number of the convex portions on the surface of the fixing member is less than 5,000 pieces per square millimeter, the toner will come into contact with areas without convex portions on the surface of the fixing member. Accordingly, some of the toner touches the surface of the fixing member, and as a result, the effect to prevent generation of offset will be slightly lessened.

Also, when the number of convex portions exceeds 5 million pieces per square millimeter, the fixing member surface becomes nearly flat. Therefore, the contact area between the fixing member and the toner is increased. Accordingly, the adhesion of the toner sticking to the surface of the fixing member is increased. As a result, the above advantage will be slightly lessened.

An exemplary embodiment of the present invention will be described in the following.

FIG. 1 is a sectional view of a fixing device of an exemplary embodiment of the present invention. The fixing device shown in FIG. 1 comprises a fixing roller having a surface layer material formed of a predetermined fluorine rubber composition on the surface of the fixing member. The detail of a member by which the fixing member is configured will be described in the following.

As shown in FIG. 1, the fixing device comprises a fixing roller 101, a press roller 102, and a web 104. The fixing roller 101 serves to fix a toner 13 transferred onto a recording material 12. The press roller 102 is arranged opposing to the fixing device 101. The web 104 serves to apply a lubricant such as silicone oil to prevent the toner from sticking to the surface of the fixing roller 101.

The fixing roller 101 comprises a core bar 105a made of aluminum, a rubber elastic body 106, and a surface layer material 103. The rubber elastic body 106 includes silicone resin and is coated over the core bar 105a made of aluminum by 2 mm in thickness. The surface layer material 103 includes a fluorine rubber composition. The surface layer material 103 is applied onto the rubber elastic body 106 and dried, after polishing the surface of the rubber elastic body 106. In this way, the fixing roller 101 of about 40 mm in outer diameter is formed. Fine convex portions are formed on the surface of the fixing roller 101. The surface roughness "Rz" of the fixing roller 101 is less than 5 $\mu$m. The number of fine convex portions are in a range from 5,000 pieces to 5 million pieces per square millimeter. Also, there is provided a heater 107 as a heat source in the core bar 105. The heater 107 is controlled so that the surface temperature of the fixing roller 101 is kept at about 140° C. to 170° C.

The press roller 102 comprises a core bar 105b made of stainless steel, a rubber elastic body 106, and fluororesin (FLC) 111. The rubber elastic body 106 is coated over the core bar 105b by about 2 mm in thickness. The fluororesin 111 is coated over the rubber elastic body 106 by 30 $\mu$m in thickness. In this way, the press roller 102 of about 40 mm in outer diameter is formed.

The web 104 includes a base material and a lubricant impregnated in the base material. The base material includes polyester non-woven cloth and PTFE (fluororesin) affixed to the non-woven cloth. The shape of the web 104 is 60 μm thick, 220 mm wide, and 800 mm long. The web 104 is taken up from a web feed roller 109 onto a web take-up roller 110 at a predetermined speed. In that case, the web 104 is pressed against the fixing roller 101 by the web pressing roller 108, and then, a lubricant impregnated in the web 104 is applied onto the fixing roller 101. In this way, a lubricant is applied to the fixing roller 101 during the fixing operation. Thus, the toner 13 is prevented from sticking to the fixing roller 101.

A film of a predetermined fluorine rubber composition is disposed on the surface layer material 103 of the fixing roller so that the toner 13 will not easily adhere to the surface layer material 103 of the fixing roller. The film is formed on the surface layer material 103 of the fixing roller by applying and drying a predetermined fluorine rubber composition.

A fluorine rubber composition contains fluorine rubber (component A), reinforcing agent (component B), antacid (component C), vulcanizing agent (component D), vulcanization accelerator (component E), spherical filler (component F), and organic solvent (component G). The fluorine rubber (component A) contains at least a polymerization degree of vinlidene fluoride.

The fluorine rubber (component A) contains at least one of a copolymer of tetrafluoroethylene/vinylidene fluoride/hexafluoropropylene, a copolymer of tetrafluoroethylene/vinylidene fluoride/propylene, and a copolymer of vinylidene/hexafluoropropylene. It is preferable to contain the fluorine rubber (component A) by 60 wt % to 70 wt % as against 100 wt % of fluorine rubber composition. Thus, it is possible to obtain a fixing member having excellent toner parting properties.

Preferably, the reinforcing agent (component B) contains medium thermal carbon. The reinforcing agent is dispersed in the fluorine rubber composition, and has an average grain size of less than 5 μm in a state of being dispersed. Also, the quantity of reinforcing agent (component B) to be applied is in a range from 20 parts to 40 parts by weight as against 100 parts by weight of fluorine rubber (component A). By this configuration, the surface layer material 103 whose surface roughness (Rz) is less than 5 μm can be obtained. Further, it is possible to obtain a fixing member having a film strength that may withstand a long-time fixing.

Preferably, the antacid (component C) contains bivalent metal oxide or hydroxide. The antacid is dispersed in the fluorine rubber composition, and has an average grain size of less than 5 μm in a state of being dispersed. Also, the quantity of antacid (component C) to be applied is in a range from 5 parts to 20 parts by weight as against 100 parts by weight of fluorine rubber (component A). By this configuration, the surface layer material 103 whose surface roughness (Rz) is 5 μm or less can be obtained. Further, it is possible to obtain a fixing member having a film strength that may withstand a long-time fixing.

Preferably, the vulcanizing agent (component D) contains a polyol or amine type vulcanizing agent. Also, the amount of vulcanizing agent (component D) to be added is in a range from 0.5 part to 5 parts by weight as against 100 parts by weight of fluorine rubber (component A). By this configuration, the surface layer material 103 is sufficiently hardened. As a result, it is possible to obtain a fixing member having a film strength that may withstand a long-time fixing.

Preferably, the vulcanization accelerator (component E) contains organic quaternary phosphonium salt or organic quaternary ammonium salt. Also, the amount of vulcanization accelerator (component E) to be added is in a range from 0.5 part to 5 parts by weight as against 100 parts by weight of fluorine rubber (component A). By this configuration, the surface layer material 103 is sufficiently hardened. As a result, it is possible to obtain a fixing member having a film strength that may withstand a long-time fixing.

Preferably, the spherical filler (component F) is a spherical filler having sphericity of over 80% and an average grain size ranging from 0.5 μm to 10 μm. Also, the amount of spherical filler (component F) to be filled is in a range from 5 parts to 30 parts by weight as against 100 parts by weight of fluorine rubber (component A). By this configuration, fine convex portions having spherical tips can be easily formed on the surface of the surface layer material 103. Further, the surface layer material 103 thus formed is as smooth as less than 5 μm in surface roughness (Rz).

The surface layer material is applied onto the rubber elastic body 106 and is dried. In this way, the surface layer material 103 of a fixing roller having numerous fine convex portions is formed. The surface layer material contains spherical grains of 0.5 μm to 10 μm in average grain size, in the ratio of 5 to 50 vol % of fill. Since the surface layer material 103 of the fixing roller has numerous fine convex portions, the toner 13 can be prevented from sticking to the surface of the surface layer material 103 of the fixing roller. As spherical grain as a filler, resin powder (silicone rubber powder, nylon powder, acryl powder, etc.), metallic powder (iron, copper, aluminum, etc.), and ceramic powder (alumina, silica, zirconia, etc.) may be used. However, it is necessary to use these spherical grains according to the types of the surface layer material of the fixing roller. In case the filler has bad wettability that affects the surface layer material, the filler will not be uniformly dispersed in the surface layer material, and fine convex portions cannot be formed. In case the filler is too great in specific gravity as compared with the surface layer material, the filler will go to the bottom of the surface layer material, and fine convex portions cannot be formed on the surface of the surface layer material 103. Also, in case the filler is too small in specific gravity, the filler will go up to the surface of the surface layer material, and fine convex portions cannot be formed on the surface of the surface layer material 103. Accordingly, it is necessary to select a suitable filler for the surface layer material in order to obtain fine convex portions having the desired shape.

As described above, since a fluorine rubber composition is disposed on the surface layer of a fixing member, when the toner 13 transferred onto the recording material 12 is fixed, the toner 13 comes into contact with convex portions of the surface layer material 103 via a lubricant. And, after the toner 13 on the recording material 12 has passed the fixing member, the toner 13 adheres to the surface of the recording material 12 larger in contact area than the surface layer of the fixing member. Therefore, the amount of toner 13 adhering to the fixing member surface is reduced. Thus, generation of offset can be reliably prevented for a long period of time. As a result, the durability of the fixing member will be improved.

The effect of a predetermined fluorine rubber composition disposed on the surface layer of a fixing roller as a fixing member will be described with reference to FIG. 2 to FIG. 5.

Figure 2:
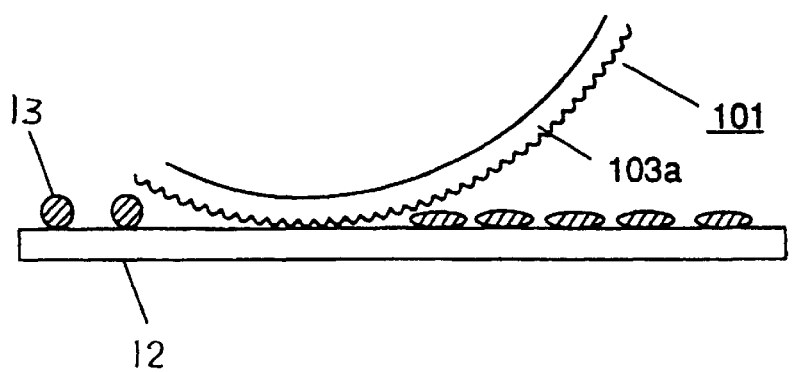
FIG. 2 is a partly enlarged view showing a state of picture image fixation in a fixing device of an embodiment of the present invention.
Figure 3:
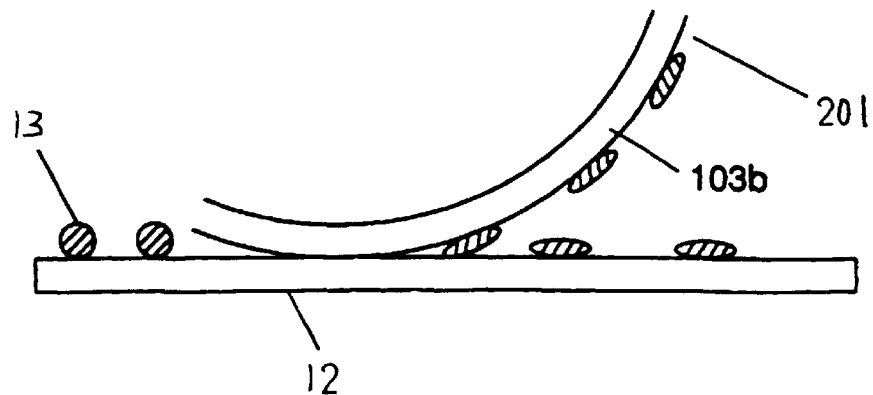
FIG. 3 is a partly enlarged view showing a state of picture image fixation in a conventional fixing device.
Figure 4:
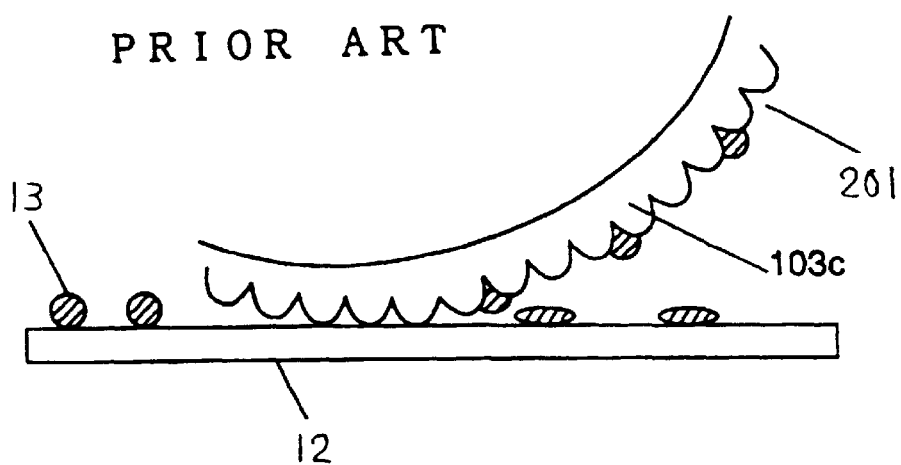
FIG. 4 is a partly enlarged view showing a state of picture image fixation in a conventional fixing device.
Figure 5:
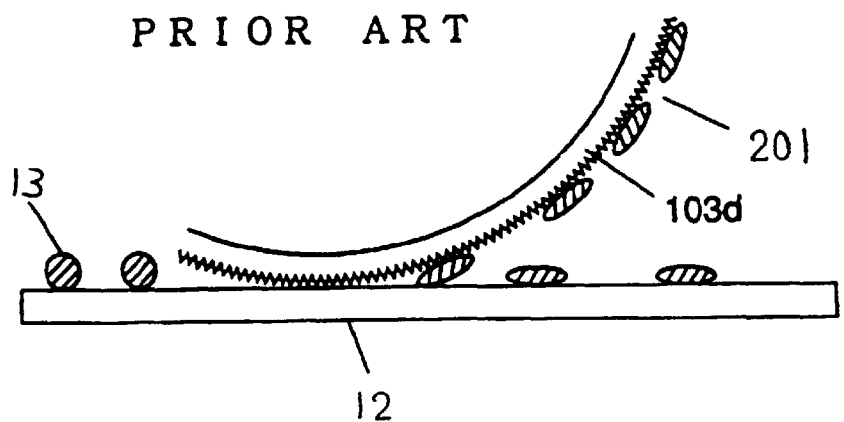
FIG. 5 is a partly enlarged view showing a state of picture image fixation in a conventional fixing device.
Figure 6:
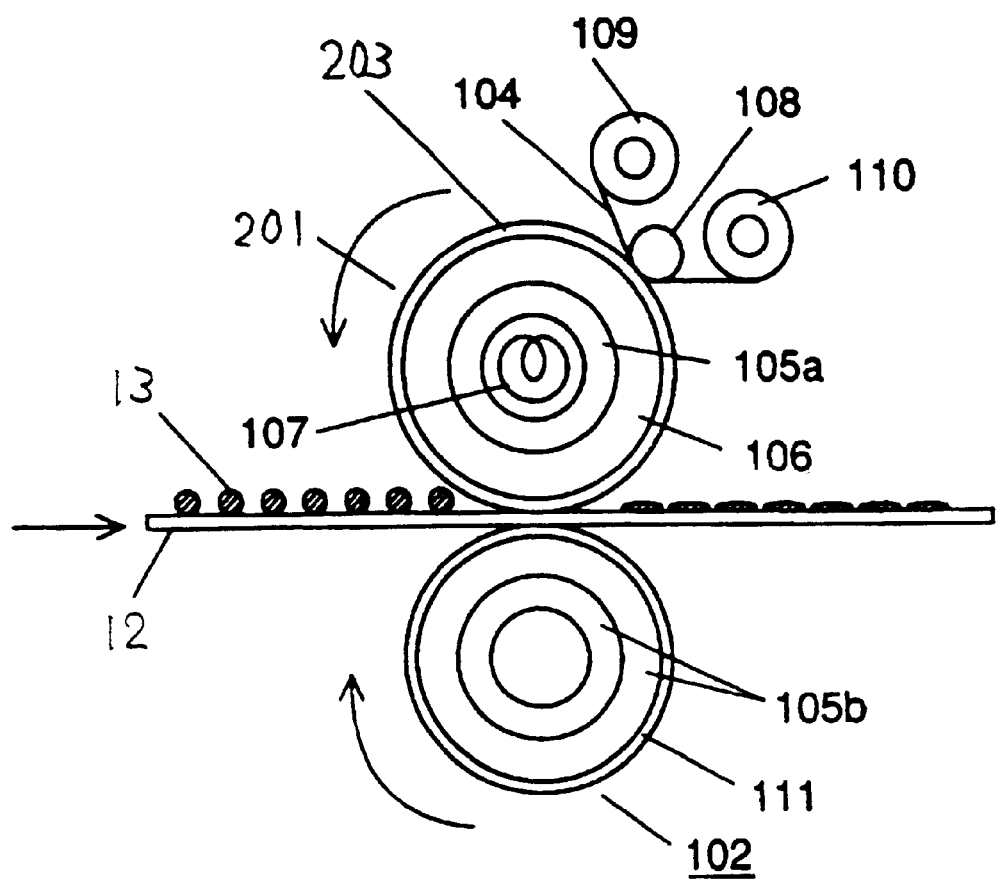
FIG. 6 is a sectional view of a conventional fixing device.

FIG. 2 is a partly enlarged view showing a state of picture image fixation in a fixing device of one embodiment of the present invention. FIG. 3, FIG. 4 and FIG. 5 are partly enlarged views showing a state of picture image fixation in a conventional fixing device.

In FIG. 3, fixing roller 201 has surface layer material 103b having a smooth surface without fine convex portions. FIG. 3 shows how the toner 13 is fixed on the recording material 12 by using surface layer material 103b without fine convex portions. When the toner 13 passes underneath the fixing roller 201, the toner 13 is squeezed by heat and pressure of the fixing roller 201. After the toner 13 has passed underneath the fixing roller 201, most of the toner 13 is fixed on the recording material 12, but some of the toner 13 sticks to the surface layer material 103b of the fixing roller. When the toner 13 sticking to the surface layer material 103b of the fixing roller comes into contact with the next recording material 12, some of the toner 13 sticks onto the next recording material 12, thereby causing generation of offset.

In FIG. 4, the surface layer material 103c of fixing roller 201 exceeds 5 µm in surface roughness (Rz). FIG. 4 shows how the toner 13 is fixed on the recording material 12 by using the fixing roller 201 with such high surface roughness of surface layer material 103c. The average grain size of toner 13 is in a range from about 10 µm to about 15 µm, and the toner 13 on the recording material 12 comes into contact with the surface of surface layer material 103c via a lubricant.

When the toner 13 passes underneath the fixing roller 201, the toner 13 is squeezed by heat and pressure of the fixing roller. Then, the toner 13 comes into contact with the surface of the surface layer material 103c having surface roughness (Rz) of over 5 µm. Therefore, some of the toner 13 sticks to the surface layer material 103c due to anchor effect. When the toner 13 sticking to the surface layer material 103c of the fixing roller comes into contact with the next recording material 12, some of the toner 13 sticks onto the recording material 12, thereby causing generation of offset.

In FIG. 5, the surface of surface layer material 103d of the fixing roller includes fine convex portions having sharp tips. FIG. 5 shows how the toner 13 is fixed on the recording material 12 by using the fixing roller with the surface layer material 103d having such fine convex portions with sharp tips. The average grain size of toner 13 ranges from about 10 µm to about 15 µm, and the toner 13 on the recording material 12 comes into contact with the surface of surface layer material 103d via a lubricant.

When the toner 13 passes underneath the fixing roller 201, the toner 13 is squeezed by heat and pressure of the fixing roller 201. Then, the toner 13 comes into contact with the surface of the surface layer material 103d having fine convex portions with sharp tips. Therefore, some of the toner 13 sticks to the surface layer material 103d due to anchor effect. When the toner 13 sticking to the surface layer material 103d of the fixing roller comes into contact with the next recording material 12, some of the toner 13 sticks onto the recording material 12, thereby causing generation of offset.

FIG. 2 is a partly enlarged view showing a state of picture image fixation in a fixing device of one embodiment of the present invention. In FIG. 2, surface layer material 103a is disposed on the surface of fixing roller 101. The surface layer material 103a has fine convex portions, and the fine convex portions have spherical tips. FIG. 2 shows how the toner 13 is fixed on the recording material 12 by using the fixing roller 101 with the surface layer material 103a having such fine convex portions. The surface layer material 103a having fine convex portions with sharp tips is formed on the surface of fixing roller 101, and the toner 13 transferred onto the recording material 12 is fixed, then the toner 13 comes into contact with the convex portions of surface layer material 103a via a lubricant. After the toner 13 on the recording material 12 has passed the fixing member, the toner 13 sticks onto the recording material 12 larger in contact area than the surface layer material 103a. Accordingly, the amount of the toner sticking to the surface layer material 12 is reduced. As a result, generation of offset can be reliably prevented for a long period of time. Further, the durability of the fixing device will be improved.

As described above, fine convex portions with spherical tips are formed on the surface of the surface layer material of the fixing roller. Preferably, the number of convex portions is in a range from 5,000 pieces to one million pieces per square millimeter, and the surface roughness (Rz) of the surface layer material is less than 5 µm. Therefore, when the toner transferred onto the recording material is fixed, the toner comes into contact, in less contact area, with the surface layer of the fixing member having excellent parting properties. After the toner on the recording material has passed the fixing member, the toner sticks onto the recording material larger in contact area than the surface layer of the fixing member. Accordingly, the amount of the toner sticking to the fixing member surface is reduced. As a result, generation of offset can be reliably prevented for a long period of time. Further, the durability of the fixing member will be improved.

Exemplary Embodiment:

An exemplary embodiment of the present invention will be described in the following.

As a surface layer material of a fixing roller, a fluorine rubber composition having the following configuration was prepared.

(Component A) Fluorine rubber:
　Ternary fluorine rubber, a copolymer of vinylidene fluoride, tetrafluoroethylene, and hexafluoropropylene. (100 parts by weight)

(Component B) Reinforcing agent:
　Medium thermal carbon. (X1 part by weight)

(Component C) Antacid:
　Magnesium oxide. (X2 parts by weight)

(Component D) Vulcanizing agent:
　Bisphenol FA. (X3 parts by weight)

(Component E) Vulcanization accelerator:
　Tetrabutyl ammonium bisulfate. (X4 parts by weight)

(Component F) Spherical filler:
　Spherical silica or glass beads. (X5 parts by weight)

(Component G) Organic solvent:
　Butyl acetate. (400 parts by weight)

A method of preparing a paint for surface layer material will be described in the following.

Three types of fluorine rubber "A1", "A2" and "A3" were prepared by an emulsion polymerization method: the fluorine rubber is a ternary copolymer consisting of vinylidene fluoride, tetrafluoroethylene, and hexafluoropropylene. The fluorine content of each fluorine rubber was measured. The results of the measurement are as follows: fluorine rubber "A1" contained fluorine by 60%, fluorine rubber "A2" contained fluorine by 65%, and fluorine rubber "A3" contained fluorine by 70%.

Also, fluorine rubber "A4" was prepared by an emulsion polymerization method: the fluorine rubber consists of vinylidene fluoride, tetrafluoroethylene, and propylene. The fluorine content of the prepared fluorine rubber was measured. Fluorine rubber "A4" contained fluorine by 55%.

(Component A): 100 parts by weight of any one of the four types of fluorine rubber "A1, "A2", "A3", "A4".

(Component B): X1 part by weight of medium thermal carbon (Huber's N-907) as a reinforcing agent.

(Component C): X2 parts by weight of magnesium oxide (Kyowa Chemical's Kyowa Mag 150) as an antacid.

(Component D): X3 parts by weight of bisphenol AF as a vulcanizing agent.

(Component E): X4 parts by weight of tetrabutyl ammonium bisulfate as a vulcanization accelerator.

(Component F): X5 parts by weight of spherical silica with 99% sphericity (Admatec's Adma Fine) or glass beads with 99% shericity (Toshiba Balotini's Hollow Glass Beads) or amorphous silica with 70% sphericity (Fuji Silicia Chemical's Cylicia) as a spherical filler.

The above components A, B, C, D, E, and F were mixed and dispersed in a roller mill disperser to prepare a mixture.

When the components were mixed and dispersed in a roller mill, various mixtures different in filler grain size were obtained by changing the operation time. Subsequently, the mixtures thus obtained were dissolved in the organic solvent (component F), 400 parts by weight of butyl acetate. In this way, various fluorine rubber compositions were obtained.

The features of various spherical fillers "F1", "F2", "F3", "F4", "F5" used in the present exemplary embodiment are shown in Table 1.

TABLE 1

| No. | Contents | Product No. | Sphericity % | Average grain size $\mu m$ |
|---|---|---|---|---|
| Spherical filler | | | | |
| F1 | Spherical silica | SO-C3 | 99 | 1 |
| F2 | Spherical silica | SO-C1 | 99 | 0.3 |
| F3 | Glass beads | HSC110 | 99 | 10 |
| F4 | Glass beads | GB301S | 99 | 45 |
| F5 | Amorphous silica | 310 | 70 | 1.4 |

A method of forming the surface layer material of a fixing roller is described in the following.

First, a silicone rubber elastic body is formed on a core bar of a fixing roller. The surface of the formed silicone rubber elastic body is polished, and then, cleaned. Next, each of the fluorine rubber compositions thus formed is sprayed and coated onto the surface of a silicone rubber elastic body, and is left at the room temperature for two hours. In this way, butyl acetate used as an organic solvent is dispersed. Subsequently, it is dried in an oven at 80° C. for two hours, and further, dried in the oven at 200° C. for one hour. Thus, fixing rollers having different surface layer materials were manufactured.

The fixing tests were carried out by using each of the fixing rollers manufactured in this way. The fixing tests were performed with respect to the examples and the comparative examples. The test results were evaluated by the number of sheets subjected to fixing tests until generation of offset. Incidentally, the number of sheets to be tested is 60,000 sheets max.

As a printer used for the tests, a color laser printer of Matsushita Electric Ind., Ltd. was employed. As a recording material, NIP paper (Kobayashi Kirokushi Co., Ltd.) of A4 size was used under the fixing test condition. Also, the fixing temperature (fixing roller surface temperature) is 160° C., and the fixing speed is 4 ppm (4 sheets/min.). The toner used is a product of Kao Soap Co., Ltd., which contains polyester resin as base resin and is 12 $\mu m$ in average grain size. The printing pattern is a 5% random pattern. Also, as a lubricant, amino denatured dimethyl polycyloxane (The Shin-etsu Chemical's) whose grain size is 1,000 cps at 25° C. was employed.

The results of the fixing tests are described with respect to the specific examples and comparative examples.

EXAMPLE 1

A paint of fluorine rubber composition was prepared by using fluorine rubber "A1" of fluorine content 60%. The average grain size of the filler contained in the prepared paint was 2 $\mu m$, and the surface roughness (Rz) of the fixing roller was 4 $\mu m$. The number of convex portions on the fixing roller surface, observed by an electronic microscope, was 250,000 pieces. As a result of the fixing test, no generation of offset was observed in fixing tests on 60,000 sheets.

EXAMPLE 2

A paint of fluorine rubber composition was prepared by using fluorine rubber "A2" fluorine content 65%. The average grain size of the filler contained in the prepared paint was 2 $\mu M$, and the surface roughness (Rz) of the fixing roller was 4 $\mu m$. The number of convex portions on the fixing roller surface, observed by an electronic microscope, was 250,000 pieces. As a result of the fixing test, no generation of offset was observed in fixing tests on 60,000 sheets.

EXAMPLE 3

A paint of fluorine rubber composition was prepared by using fluorine rubber "A3" of fluorine content 70%. The average grain size of the filler contained in the prepared paint was 2 $\mu m$, and the surface roughness (Rz) of the fixing roller was 4 $\mu m$. The number of convex portions on the fixing roller surface, observed by an electronic microscope, was 250,000 pieces. As a result of the fixing test, no generation of offset was observed in fixing tests on 60,000 sheets.

EXAMPLE 4

A paint of fluorine rubber composition containing 100 parts by weight of fluorine rubber "A2" of fluorine content 65% and 20 parts by weight of reinforcing agent (component B) was prepared. The average grain size of the filler contained in the prepared paint was 2 $\mu m$, and the surface roughness (Rz) of the fixing roller was 3 $\mu m$. The number of convex portions on the fixing roller surface, observed by an electronic microscope, was 250,000 pieces. As a result of the fixing test, no generation of offset was observed in fixing tests on 60,000 sheets.

EXAMPLE 5

A paint of fluorine rubber composition containing 100 parts by weight of fluorine rubber "A2" of fluorine content 65% and 40 parts by weight of reinforcing agent (component B) was prepared. The average grain size of the filler contained in the prepared paint was 2 $\mu m$, and the surface roughness (Rz) of the fixing roller was 4 $\mu m$. The number of convex portions on the fixing roller surface, observed by an electronic microscope, was 250,000 pieces. As a result of the fixing test, no generation of offset was observed in fixing tests on 60,000 sheets.

EXAMPLE 6

A paint of fluorine rubber composition containing 100 parts by weight of fluorine rubber "A2" of fluorine content 65% and 5 parts by weight of antacid (component C) was prepared. The average grain size of the filler contained in the prepared paint was 2 μm, and the surface roughness (Rz) of the fixing roller was 4 μm. The number of convex portions on the fixing roller surface, observed by an electronic microscope, was 250,000 pieces. As a result of the fixing test, no generation of offset was observed in fixing tests on 60,000 sheets.

EXAMPLE 7

A paint of fluorine rubber composition containing 100 parts by weight of fluorine rubber "A2" of fluorine content 65% and 20 parts by weight of antacid (component C) was prepared. The average grain size of the filler contained in the prepared paint was 2 μm, and the surface roughness (Rz) of the fixing roller was 4 μm. The number of convex portions on the fixing roller surface, observed by an electronic microscope, was 250,000 pieces. As a result of the fixing test, no generation of offset was observed in fixing tests on 60,000 sheets.

EXAMPLE 8

A paint of fluorine rubber composition was prepared by using fluorine rubber "A2" of fluorine content 65%. In the process of preparing the paint, the operation time for dispersion by a roller mill disperser was shortened. The average grain size of the filler contained in the prepared paint was 4 μm, and the surface roughness (Rz) of the fixing roller was 5 μm. The number of convex portions on the fixing roller surface, observed by an electronic microscope, was 250,000 pieces. As a result of the fixing test, no generation of offset was observed in fixing tests on 60,000 sheets.

EXAMPLE 9

A paint of fluorine rubber composition containing 100 parts by weight of fluorine rubber "A2" of fluorine content 65% and 0.5 parts by weight of vulcanizing agent (component D) was prepared. The average grain size of the filler contained in the prepared paint was 2 μm, and the surface roughness (Rz) of the fixing roller was 4 μm. The number of convex portions on the fixing roller surface, observed by an electronic microscope, was 250,000 pieces. As a result of the fixing test, no generation of offset was observed in fixing tests on 60,000 sheets.

EXAMPLE 10

A paint of fluorine rubber composition containing 100 parts by weight of fluorine rubber "A2" of fluorine content 65% and 5 parts by weight of vulcanizing agent (component D) was prepared. The average grain size of the filler contained in the prepared paint was 2 μm, and the surface roughness (Rz) of the fixing roller was 4 μm. The number of convex portions on the fixing roller surface, observed by an electronic microscope, was 250,000 pieces. As a result of the fixing test, no generation of offset was observed in fixing tests on 60,000 sheets.

EXAMPLE 11

A paint of fluorine rubber composition containing 100 parts by weight of fluorine rubber "A2" of fluorine content 65% and 0.5 parts by weight of vulcanization accelerator (component E) was prepared. The average grain size of the filler contained in the prepared paint was 2 μm, and the surface roughness (Rz) of the fixing roller was 4 μm. The number of convex portions on the fixing roller surface, observed by an electronic microscope, was 250,000 pieces. As a result of the fixing test, no generation of offset was observed in fixing tests on 60,000 sheets.

EXAMPLE 12

A paint of fluorine rubber composition containing 100 parts by weight of fluorine rubber "A2" of fluorine content 65% and 5 parts by weight of vulcanization accelerator (component E) was prepared. The average grain size of the filler contained in the prepared paint was 2 μm, and the surface roughness (Rz) of the fixing roller was 4 μm. The number of convex portions on the fixing roller surface, observed by an electronic microscope, was 250,000 pieces. As a result of the fixing test, no generation of offset was observed in fixing tests on 60,000 sheets.

EXAMPLE 13

A paint of fluorine rubber composition containing 100 parts by weight of fluorine rubber "A2" of fluorine content 65% and 5 parts by weight of spherical filler (F1) was prepared. The average grain size of the filler contained in the prepared paint was 2 μm, and the surface roughness (Rz) of the fixing roller was 4 μm. The number of convex portions on the fixing roller surface, observed by an electronic microscope, was 50,000 pieces. As a result of the fixing test, no generation of offset was observed in fixing tests on 60,000 sheets.

EXAMPLE 14

A paint of fluorine rubber composition containing 100 parts by weight of fluorine rubber "A2" of fluorine content 65% and 30 parts by weight of spherical filler (F1) was prepared. The average grain size of the filler contained in the prepared paint was 2 μm, and the surface roughness (Rz) of the fixing roller was 4 μm. The number of convex portions on the fixing roller surface, observed by an electronic microscope, was one million pieces. As a result of the fixing test, no generation of offset was observed in fixing tests on 60,000 sheets.

EXAMPLE 15

A paint of fluorine rubber composition containing 100 parts by weight of fluorine rubber "A2" of fluorine content 65% and 15 parts by weight of spherical filler (F3) was prepared. The average grain size of the filler contained in the prepared paint was 2 μm, and the surface roughness (Rz) of the fixing roller was 5 μm. The number of convex portions on the fixing roller surface, observed by an electronic microscope, was 20,000 pieces. As a result of the fixing test, no generation of offset was observed in fixing tests on 60,000 sheets.

EXAMPLE 16

A paint of fluorine rubber composition containing 100 parts by weight of fluorine rubber "A2" of fluorine content 65% and parts by weight of spherical filler (F3) was prepared. The average grain size of the filler contained in the prepared paint was 2 μm, and the surface roughness (Rz) of the fixing roller was 5 μm. The number of convex portions on the fixing roller surface, observed by an electronic microscope, was 5,000 pieces. As a result of the fixing test, no generation of offset was observed in fixing tests on 60,000 sheets.

COMPARATIVE EXAMPLE 1

A paint of fluorine rubber composition was prepared by using fluorine rubber "A4" of fluorine content 55%. The average grain size of the filler contained in the prepared paint was 2 μm, and the surface roughness (Rz) of the fixing roller was 4 μm. The number of convex portions on the fixing roller surface, observed by an electronic microscope, was 250,000 pieces. As a result of the fixing test, generation of offset was observed in fixing tests on 5,000 sheets.

COMPARATIVE EXAMPLE 2

A paint of fluorine rubber composition containing 100 parts by weight of fluorine rubber "A2" of fluorine content 65% and 15 parts by weight of reinforcing agent (component B) was prepared. The average grain size of the filler contained in the prepared paint was 2 μm, and the surface roughness (Rz) of the fixing roller was 4 μm. The number of convex portions on the fixing roller surface, observed by an electronic microscope, was 250,000 pieces. As a result of the fixing test, generation of offset was observed in fixing tests on 30,000 sheets.

COMPARATIVE EXAMPLE 3

A paint of fluorine rubber composition containing 100 parts by weight of fluorine rubber "A2" of fluorine content 65% and 45 parts by weight of reinforcing agent (component B) was prepared. The average grain size of the filler contained in the prepared paint was 2 μm, and the surface roughness (Rz) of the fixing roller was 4 μm. The number of convex portions on the fixing roller surface, observed by an electronic microscope, was 250,000 pieces. As a result of the fixing test, generation of offset was observed in fixing tests on 15,000 sheets.

COMPARATIVE EXAMPLE 4

A paint of fluorine rubber composition was prepared by using fluorine rubber "A2" of fluorine content 65%. In the process of preparing the paint, the operation time for dispersion by a roller mill disperser was shortened. The average grain size of the filler contained in the prepared paint was 8 μm, and the surface roughness (Rz) of the fixing roller was 15 μm. The number of convex portions on the fixing roller surface, observed by an electronic microscope, was 10,000 pieces. As a result of the fixing test, no generation of offset was observed in fixing tests on 5,000 sheets.

COMPARATIVE EXAMPLE 5

A paint of fluorine rubber composition containing 100 parts by weight of fluorine rubber "A2" of fluorine content 65% and 3 parts by weight of antacid (component C) was prepared. The average grain size of the filler contained in the prepared paint was 2 μm, and the surface roughness (Rz) of the fixing roller was 4 μm. The number of convex portions on the fixing roller surface, observed by an electronic microscope, was 250,000 pieces. As a result of the fixing test, generation of offset was observed in fixing tests on 15,000 sheets.

COMPARATIVE EXAMPLE 6

A paint of fluorine rubber composition containing 100 parts by weight of fluorine rubber "A2" of fluorine content 65% and 25 parts by weight of antacid (component C) was prepared. The average grain size of the filler contained in the prepared paint was 2 μm, and the surface roughness (Rz) of the fixing roller was 4 μm. The number of convex portions on the fixing roller surface, observed by an electronic microscope, was 250,000 pieces. As a result of the fixing test, generation of offset was observed in fixing tests on 30,000 sheets.

COMPARATIVE EXAMPLE 7

A paint of fluorine rubber composition containing 100 parts by weight of fluorine rubber "A2" of fluorine content 65% and 0.2 part by weight of vulcanizing agent (component D) was prepared. The average grain size of the filler contained in the prepared paint was 2 μm, and the surface roughness (Rz) of the fixing roller was 4 μm. The number of convex portions on the fixing roller surface, observed by an electronic microscope, was 250,000 pieces. As a result of the fixing test, no generation of offset was observed in fixing tests on 5,000 sheets.

COMPARATIVE EXAMPLE 8

A paint of fluorine rubber composition containing 100 parts by weight of fluorine rubber "A2" of fluorine content 65% and 7 parts by weight of vulcanizing agent (component D) was prepared. The average grain size of the filler contained in the prepared paint was 2 μm, and the surface roughness (Rz) of the fixing roller was 4 μm. The number of convex portions on the fixing roller surface, observed by an electronic microscope, was 250,000 pieces. As a result of the fixing test, no generation of offset was observed in fixing tests on 40,000 sheets.

COMPARATIVE EXAMPLE 9

A paint of fluorine rubber composition containing 100 parts by weight of fluorine rubber "A2" of fluorine content 65% and 0.2 part by weight of vulcanization accelerator (component E) was prepared. The average grain size of the filler contained in the prepared paint was 2 μm, and the surface roughness (Rz) of the fixing roller was 4 μm. The number of convex portions on the fixing roller surface, observed by an electronic microscope, was 250,000 pieces. As a result of the fixing test, no generation of offset was observed in fixing tests on 10,000 sheets.

COMPARATIVE EXAMPLE 10

A paint of fluorine rubber composition containing 100 parts by weight of fluorine rubber "A2" of fluorine content 65% and 7 parts by weight of vulcanization accelerator (component E) was prepared. The average grain size of the filler contained in the prepared paint was 2 μm, and the surface roughness (Rz) of the fixing roller was 4 μm. The number of convex portions on the fixing roller surface, observed by an electronic microscope, was 250,000 pieces. As a result of the fixing test, no generation of offset was observed in fixing tests on 45,000 sheets.

COMPARATIVE EXAMPLE 11

A paint of fluorine rubber composition containing 100 parts by weight of fluorine rubber "A2" of fluorine content 65% and 15 parts by weight of spherical filler (F4) was prepared. The average grain size of the filler contained in the prepared paint was 2 μm, and the surface roughness (Rz) of the fixing roller was 4 μm. The number of convex portions on the fixing roller surface, observed by an electronic microscope, was two million pieces. As a result of the fixing test, no generation of offset was observed in fixing tests on 10,000 sheets.

COMPARATIVE EXAMPLE 12

A paint of fluorine rubber composition containing 100 parts by weight of fluorine rubber "A2" of fluorine content 65% and 15 parts by weight of spherical filler (F4) was prepared. The average grain size of the filler contained in the prepared paint was 2 μm, and the surface roughness (Rz) of the fixing roller was 4 μm. The number of convex portions on the fixing roller surface, observed by an electronic microscope, was 2,000 pieces. As a result of the fixing test, no generation of offset was observed in fixing tests on 5,000 sheets.

COMPARATIVE EXAMPLE 13

A paint of fluorine rubber composition containing 100 parts by weight of fluorine rubber "A2" of fluorine content 65% and 15 parts by weight of spherical filler (F5) was prepared. The average grain size of the filler contained in the prepared paint was 2 μm, and the surface roughness (Rz) of the fixing roller was 4 μm. The number of convex portions on the fixing roller surface, observed by an electronic microscope, was 100,000 pieces. As a result of the fixing test, no generation of offset was observed in fixing tests on 2,000 sheets.

The paint configuration and properties of the fluorine rubber composition used for the examples, and the features of film coat of fluorine rubber composition, and the test results are shown in Table 2, 3, and 4.

TABLE 2

|  | 1 | 2 | 3 | 4 | 5 | 6 |
|---|---|---|---|---|---|---|
| Paint configuration |  |  |  |  |  |  |
| Fluorine rubber |  |  |  |  |  |  |
| A1 | 100 |  |  |  |  |  |
| A2 |  | 100 |  | 100 | 100 | 100 |
| A3 |  |  | 100 |  |  |  |
| A4 |  |  |  |  |  |  |
| Reinforcing agent B | 30 | 30 | 30 | 20 | 40 | 30 |
| Antacid C | 10 | 10 | 10 | 10 | 10 | 5 |
| Vulcanizing agent D | 2 | 2 | 2 | 2 | 2 | 2 |
| Vulcanization accelerator E | 2 | 2 | 2 | 2 | 2 | 2 |
| Spherical filler |  |  |  |  |  |  |
| F1 | 15 | 15 | 15 | 15 | 15 | 15 |
| F2 |  |  |  |  |  |  |
| F3 |  |  |  |  |  |  |
| F4 |  |  |  |  |  |  |
| F5 |  |  |  |  |  |  |
| Organic solvent G | 400 | 400 | 400 | 400 | 400 | 400 |
| Properties |  |  |  |  |  |  |
| Average grain size μm | 2 | 2 | 2 | 2 | 2 | 2 |
| Features of film coat |  |  |  |  |  |  |
| Surface roughness Rz μm | 4 | 4 | 4 | 4 | 4 | 4 |
| Number of convex portions 1,000 pcs/mm² | 250 | 250 | 250 | 250 | 250 | 250 |
| Number of sheets tested | 60 k | 60 k | 60 k | 60 k | 60 k | 60 k |

TABLE 3

|  | 7 | 8 | 9 | 10 | 11 | 12 |
|---|---|---|---|---|---|---|
| Paint configuration |  |  |  |  |  |  |
| Fluorine rubber |  |  |  |  |  |  |
| A1 |  |  |  |  |  |  |
| A2 | 100 | 100 | 100 | 100 | 100 | 100 |
| A3 |  |  |  |  |  |  |
| A4 |  |  |  |  |  |  |
| Reinforcing agent B | 30 | 30 | 30 | 30 | 30 | 30 |
| Antacid C | 20 | 10 | 10 | 10 | 10 | 10 |
| Vulcanizing agent D | 2 | 2 | 0.5 | 5 | 2 | 2 |
| Vulcanization accelerator E | 2 | 2 | 2 | 2 | 0.5 | 5 |
| Spherical filler |  |  |  |  |  |  |
| F1 | 15 | 15 | 15 | 15 | 15 | 15 |
| F2 |  |  |  |  |  |  |
| F3 |  |  |  |  |  |  |
| F4 |  |  |  |  |  |  |
| F5 |  |  |  |  |  |  |
| Organic solvent G | 400 | 400 | 400 | 400 | 400 | 400 |
| Properties |  |  |  |  |  |  |
| Average grain size μm | 2 | 2 | 2 | 2 | 2 | 2 |
| Features of film coat |  |  |  |  |  |  |
| Surface roughness Rz μm | 4 | 4 | 4 | 4 | 4 | 4 |
| Number of convex portions 1,000 pcs/mm² | 250 | 250 | 250 | 250 | 250 | 250 |
| Number of sheets tested | 60 k | 60 k | 60 k | 60 k | 60 k | 60 k |

TABLE 4

|  | 13 | 14 | 15 | 16 |
|---|---|---|---|---|
| Paint configuration |  |  |  |  |
| Fluorine rubber |  |  |  |  |
| A1 |  |  |  |  |
| A2 | 100 | 100 | 100 | 100 |
| A3 |  |  |  |  |
| A4 |  |  |  |  |
| Reinforcing agent B | 30 | 30 | 30 | 30 |
| Antacid C | 20 | 10 | 10 | 10 |
| Vulcanizing agent D | 2 | 2 | 2 | 2 |
| Vulcanization accelerator E | 2 | 2 | 2 | 2 |
| Spherical filler |  |  |  |  |
| F1 | 5 | 30 |  |  |
| F2 |  |  |  |  |
| F3 |  |  | 15 | 5 |
| F4 |  |  |  |  |
| F5 |  |  |  |  |
| Organic solvent F | 400 | 400 | 400 | 400 |
| Properties |  |  |  |  |
| Average grain size μm | 2 | 2 | 2 | 2 |
| Features of film coat |  |  |  |  |
| Surface roughness Rz μm | 4 | 4 | 5 | 5 |
| Number of convex portions 1,000 pcs/mm² | 50 | 1000 | 20 | 5 |
| Number of sheets tested | 60 k | 60 k | 60 k | 60 k |

The paint configuration and properties of the fluorine rubber used for the comparative examples, and the features of film coat of fluorine rubber composition, and the test results are shown in Table 5 and 6.

TABLE 5

|  | CE1 | CE2 | CE3 | CE4 | CE5 | CE6 |
|---|---|---|---|---|---|---|
| Paint configuration |  |  |  |  |  |  |
| Fluorine rubber |  |  |  |  |  |  |
| A1 |  |  |  |  |  |  |
| A2 |  | 100 | 100 | 100 | 100 | 100 |

TABLE 5-continued

|  | CE1 | CE2 | CE3 | CE4 | CE5 | CE6 |
| --- | --- | --- | --- | --- | --- | --- |
| A3 |  |  |  |  |  |  |
| A4 |  | 100 |  |  |  |  |
| Reinforcing agent B | 30 | 15 | 45 | 30 | 30 | 35 |
| Antacid C | 10 | 15 | 15 | 15 | 3 | 25 |
| Vulcanizing agent D | 2 | 2 | 2 | 2 | 2 | 2 |
| Vulcanization accelerator E | 2 | 2 | 2 | 2 | 2 | 2 |
| Spherical filler |  |  |  |  |  |  |
| F1 | 15 | 15 | 15 | 15 | 15 | 15 |
| F2 |  |  |  |  |  |  |
| F3 |  |  |  |  |  |  |
| F4 |  |  |  |  |  |  |
| F5 |  |  |  |  |  |  |
| Organic solvent G | 400 | 400 | 400 | 400 | 400 | 400 |
| Properties |  |  |  |  |  |  |
| Average grain size μm | 2 | 2 | 2 | 8 | 2 | 2 |
| Features of film coat |  |  |  |  |  |  |
| Surface roughness Rz μm | 4 | 4 | 4 | 15 | 4 | 4 |
| Number of convex portions 1,000 pcs/mm² | 250 | 250 | 250 | 10 | 250 | 250 |
| Number of sheets tested | 5 k | 30 k | 15 k | 5 k | 15 k | 30 k |

TABLE 6

|  | CE7 | CE8 | CE9 | CE10 | CE11 | CE12 | CE13 |
| --- | --- | --- | --- | --- | --- | --- | --- |
| Paint configuration |  |  |  |  |  |  |  |
| Fluorine rubber |  |  |  |  |  |  |  |
| A1 |  |  |  |  |  |  |  |
| A2 | 100 | 100 | 100 | 100 | 100 | 100 | 100 |
| A3 |  |  |  |  |  |  |  |
| A4 |  |  |  |  |  |  |  |
| Reinforcing agent B | 35 | 30 | 30 | 30 | 30 | 30 | 30 |
| Antacid C | 15 | 15 | 15 | 15 | 15 | 15 | 15 |
| Vulcanizing agent D | 0.2 | 7 | 2 | 2 | 2 |  | 2 |
| Vulcanization accelerator E | 2 | 2 | 0.2 | 7 | 2 |  | 2 |
| Spherical filler |  |  |  |  |  |  |  |
| F1 | 15 | 15 | 15 | 15 |  |  |  |
| F2 |  |  |  |  | 15 |  |  |
| F3 |  |  |  |  |  |  |  |
| F4 |  |  |  |  |  | 15 |  |
| F5 |  |  |  |  |  |  | 15 |
| Organic solvent F | 400 | 400 | 400 | 400 | 400 | 400 | 400 |
| Properties |  |  |  |  |  |  |  |
| Average grain size μm | 2 | 2 | 2 | 2 | 2 | 2 | 2 |
| Features of film coat |  |  |  |  |  |  |  |
| Surface roughness Rz μm | 4 | 4 | 4 | 4 | 4 | 4 | 4 |
| Number of convex portions 1,000 pcs/mm² | 250 | 250 | 250 | 250 | 2000 | 2 | 100 |
| Number of sheets tested | 5 k | 40 k | 10 k | 45 k | 10 k | 5 k | 2 k |

As shown above, for the fixing devices in the examples 1 through 16, no generation of offset was observed in fixing tests on 60,000 sheets. Further, the fixing devices in the examples 1 through 16 are more excellent in durability of the fixing rollers as compared with the fixing devices in the comparative examples 1 through 13.

As described above, by using the fixing member, fixing device, and fixing method of the present invention, generation of offset can be reliably prevented for a long period of time. Further, the durability of the fixing roller will be improved That is, when a toner is fixed, the adhesion of the toner to the surface of the fixing member is lowered, and the amount of the toner adhering to the surface layer material of the fixing member is reduced. As a result, generation of offset can be prevented. In addition, a fixing device having excellent durability can be obtained.

What is claimed is:

1. A fixing member to fix a toner transferred onto a recording material, comprising:
   a base material, and
   a surface layer material disposed on a surface of said base material, said surface layer material contains fluorine rubber having a polymerization degree based on vinylidene fluoride and grains of spherical filler having a sphericity of more than 80% in accordance with the following formula:

$$\{1-(|A-B|)/[(A+B)]/2\} \times 100$$

wherein A is the major axis of the grain of the spherical filler and B is the minor axis of the grain of the spherical filler.

2. The fixing member of claim 1, wherein said surface layer further contains at least one selected from the group consisting of a reinforcing agent, antacid, vulcanizing agent and vulcanization accelerator.

3. The fixing member of claim 1, wherein said fluorine rubber contains at least one copolymer selected from the group consisting of:
   a copolymer of tetrafluoroethylene, vinylidene fluoride and hexafluoropropylene;
   a copolymer of tetrafluoroethylene, vinylidene fluoride and propylene; and
   a copolymer of vinylidene fluoride and hexafluoropropylene.

4. The fixing member of claim 3, wherein said copolymer contains fluorine in a range from 60 wt % to 70 wt %.

5. The fixing member of claim 1, wherein each convex portion has a spherical tip.

6. The fixing member of claim 1, wherein the numerous fine convex portions are formed in a range from 5,000 pieces to one million pieces per square millimeter.

7. The fixing member of claim 1, wherein said surface layer material is less than 5 μm in surface roughness (Rz).

8. The fixing member of claim 1, wherein the average grain size of said grains of spherical filler ranges from 0.5 μm to 10 μm.

9. The fixing member of claim 1, wherein said grains of spherical filler is contained in a range from 5 parts to 30 parts by weight as against 100 parts by weight of said fluorine rubber.

10. The fixing member of claim 1, wherein said surface layer further contains a reinforcing agent; said reinforcing agent contains medium thermal carbon; and the average grain size of said reinforcing agent is less than 5 μm in a state of being dispersed in said fluorine rubber composition.

11. The fixing member of claim 1, wherein said surface layer material further contains a reinforcing agent and antacid; the average grain size of said reinforcing agent is less than 5 μm in a state of being dispersed in said surface layer material, and said reinforcing agent is contained in a range from 20 parts to 40 parts by weight as against 100 parts by weight of said fluorine rubber; the average grain size of said antacid is less than 5 μm in a state of being dispersed in said surface layer material, and said antacid is contained in a range from 5 parts to 20 parts by weight as against 100 parts by weight of said fluorine rubber; and the average grain size of said spherical filler ranges from 0.5 µm to 10 µm in a state of being dispersed in said surface layer material, and said grains of spherical filler is contained in a range from 5 parts to 30 parts by weight as against 100 parts by weight of said fluorine rubber.

12. The fixing member of claim 1, wherein said base material has a roller shape; said base material includes a core bar, and a rubber elastic body disposed on the surface of said core bar; and said fluorine rubber composition has a circular section and is disposed on the surface of said rubber elastic body having a roller shape.

13. A fixing device to fix a toner transferred onto the surface of a recording material, comprising:

a fixing roller;

a press roller disposed opposing to said fixing roller, said fixing roller comprises a base material and a surface layer material disposed on the surface of said base material; said surface layer material contains fluorine rubber having a polymerization degree based on vinylidene fluoride and grains of spherical filler to provide a plurality of convex portions on said surface layer, said grains of spherical filler having a sphericity of more than 80% in accordance with the following formula:

$$\{1-(|A-B|)/[(A+B)]/2\} \times 100$$

wherein A is the major axis of the grain of the spherical filler and B is the minor axis of the grain of the spherical filler;

a web to apply a lubricant to the surface of said fixing roller, and a recording material having said toner transferred thereon passes between said fixing roller and said press roller while being pressed by said fixing roller and said press roller so that said surface layer material comes into contact with said toner, and then said toner is fixed on said recording material.

14. The fixing device of claim 13, wherein said fluorine rubber contains at least one copolymer selected from the group consisting of:

a copolymer of tetrafluoroethylene, vinylidene fluoride and hexafluoropropylene;

a copolymer of tetrafluoroethylene, vinylidene fluoride and propylene; and a copolymer of vinylidene fluoride and hexafluoropropylene.

15. The fixing device of claim 14, wherein said copolymer contains fluorine in a range from 60 wt % to 70 wt %.

16. The fixing device of claim 13, wherein said surface layer material further contains at least one selected from the group consisting of a reinforcing agent, antacid, vulcanizing agent, and vulcanization accelerator.

17. The fixing device of claim 13, wherein each convex portion of the numerous fine convex portions has a spherical tip.

18. The fixing device of claim 13, wherein the numerous fine convex portions are formed in a range from 5,000 pieces to one million pieces per square millimeter.

19. The fixing device of claim 13, wherein said surface layer material is less than 5 µm in surface roughness (Rz).

20. The fixing device of claim 13, wherein the average grain size of said grains of spherical filler ranges from 0.5 µm to 10 µm.

21. The fixing device of claim 20, wherein said grains of spherical filler is contained in a range from 5 parts to 30 parts by weight as against 100 parts by weight of said fluorine rubber.

22. The fixing device of claim 13, wherein said surface layer material further contains a reinforcing agent and antacid; the average grain size of said reinforcing agent is less than 5 µm in a state of being dispersed in said surface layer material, and said reinforcing agent is contained in a range from 20 parts to 40 parts by weight as against 100 parts by weight of said fluorine rubber; the average grain size of said antacid is less than 5 µm in a state of being dispersed in said surface layer material, and said antacid is contained in a range from 5 parts to 20 parts by weight as against 100 parts by weight of said fluorine rubber; and the average grain size of grains of spherical filler ranges from 0.5 µm to 10 µm in a state of being dispersed in said surface layer material, and said grains of spherical filler is contained in a range from 5 parts to 30 parts by weight as against 100 parts by weight of said fluorine rubber.

23. The fixing device of claim 13, wherein said base material includes a core bar, and a rubber elastic body disposed on said core bar; and said fixing roller further includes a heater disposed in said core bar.

* * * * *